US008734768B2

(12) United States Patent
Wang et al.

(10) Patent No.: US 8,734,768 B2
(45) Date of Patent: May 27, 2014

(54) ANIMAL LITTER, PROCESS FOR PREPARING ANIMAL LITTER, AND METHOD FOR REMOVAL OF ANIMAL WASTE

(75) Inventors: Lin Wang, Iowa City, IA (US); Katherine Lauren Gregory, White Plains, NY (US)

(73) Assignee: Grain Processing Corporation, Muscatine, IA (US)

( * ) Notice: Subject to any disclaimer, the term of this patent is extended or adjusted under 35 U.S.C. 154(b) by 66 days.

(21) Appl. No.: 13/103,778

(22) Filed: May 9, 2011

(65) Prior Publication Data

US 2012/0288468 A1    Nov. 15, 2012

(51) Int. Cl.
*A61L 11/00*    (2006.01)
*A01K 29/00*    (2006.01)

(52) U.S. Cl.
USPC .................... 424/76.6; 119/165; 119/171

(58) Field of Classification Search
None
See application file for complete search history.

(56) References Cited

U.S. PATENT DOCUMENTS

| | | | |
|---|---|---|---|
| 3,059,615 A | 10/1962 | Kuceski et al. | |
| 3,747,564 A | 7/1973 | Bickoff et al. | |
| 3,789,797 A | 2/1974 | Brewer | |
| 3,921,581 A | 11/1975 | Brewer | |
| 3,923,005 A | 12/1975 | Fry et al. | |
| 4,007,708 A | 2/1977 | Yacono | |
| 4,009,684 A | 3/1977 | Kliment et al. | |
| 4,020,156 A | 4/1977 | Murray et al. | |
| 4,107,119 A | 8/1978 | Kameyama et al. | |
| 4,157,696 A | 6/1979 | Carlberg | |
| 4,159,008 A | 6/1979 | Bavaveas | |
| 4,206,718 A | 6/1980 | Brewer | |
| 4,258,660 A | 3/1981 | Pris et al. | |
| 4,261,849 A | 4/1981 | Benjaminson | |
| 4,296,234 A | 10/1981 | Mindt et al. | |
| 4,315,761 A | 2/1982 | Larrson et al. | |
| 4,355,593 A | 10/1982 | Stapley | |
| 4,374,794 A | 2/1983 | Kok | |
| 4,407,231 A | 10/1983 | Colborn et al. | |
| 4,519,340 A | 5/1985 | Dickey | |
| 4,534,891 A | 8/1985 | Boden et al. | |
| 4,607,594 A | 8/1986 | Thacker | |
| 4,673,576 A * | 6/1987 | D'Aiello, Jr. .................... 426/2 |
| 4,685,420 A | 8/1987 | Stuart | |
| 4,727,824 A | 3/1988 | Ducharme et al. | |
| 4,770,878 A | 9/1988 | Thomas | |
| 4,794,022 A | 12/1988 | Johnson et al. | |
| 4,844,010 A | 7/1989 | Ducharme et al. | |
| 4,883,021 A | 11/1989 | Ducharme et al. | |
| 4,963,366 A | 10/1990 | Thomas | |
| 5,000,115 A | 3/1991 | Hughes | |
| 5,001,115 A | 3/1991 | Sloan | |
| 5,014,650 A | 5/1991 | Sowle | |
| 5,016,568 A | 5/1991 | Stanislowski et al. | |
| 5,062,954 A | 11/1991 | Leedy et al. | |
| 5,085,175 A | 2/1992 | Clements, Jr. et al. | |
| 5,094,189 A | 3/1992 | Aylen et al. | |
| 5,101,771 A | 4/1992 | Goss | |
| 5,152,250 A | 10/1992 | Loeb | |
| 5,154,594 A | 10/1992 | Gamlen | |
| 5,176,107 A | 1/1993 | Buschur | |
| 5,183,010 A | 2/1993 | Raymond et al. | |
| 5,188,064 A | 2/1993 | House | |
| 5,193,489 A | 3/1993 | Hardin | |
| 5,207,389 A | 5/1993 | Hall | |
| 5,207,830 A | 5/1993 | Cowan et al. | |
| 5,209,185 A | 5/1993 | Chikazawa | |
| 5,215,041 A | 6/1993 | Krahenbuhl | |
| 5,216,980 A | 6/1993 | Kiebke | |
| 5,230,305 A | 7/1993 | House | |
| 5,239,880 A | 8/1993 | Hawkins | |
| 5,329,880 A | 7/1994 | Pattengill et al. | |
| 5,339,769 A | 8/1994 | Toth et al. | |
| 5,352,780 A | 10/1994 | Webb et al. | |
| 5,358,607 A | 10/1994 | Elli | |
| 5,361,719 A | 11/1994 | Kiebke | |
| 5,415,131 A | 5/1995 | Dodman | |
| 5,452,684 A | 9/1995 | Elazier-Davis et al. | |
| 5,458,091 A | 10/1995 | Pattengill et al. | |
| 5,469,809 A | 11/1995 | Coleman | |
| 5,503,111 A | 4/1996 | Hughes | |
| 5,526,770 A | 6/1996 | Kiebke | |

(Continued)

FOREIGN PATENT DOCUMENTS

| | | |
|---|---|---|
| EP | 1466522 | 10/2004 |
| JP | 60094042 | 5/1985 |
| JP | 10271931 | 10/1998 |
| WO | 9930556 | 6/1999 |
| WO | 0197604 | 12/2001 |
| WO | 03088739 | 10/2003 |

OTHER PUBLICATIONS

Buckner et al. Bulletin—Kentucky Agricultural Experiment Station, . . . University of Kentucky, Lexington, KY Bulletin No. 220; Mar. 29, 1919; pp. 7 and 9.*
International Search Report and the Written Opinion of the International Searching Authority in International Application No. PCT/US2010/025253, Jun. 15, 2012, 13 pages.
Ranasinghe T.K.G. 1999, Chapter IV, Part 16—Coconut Processing in: Modern Coconut Management; Palm Cultivation and Products, edited by Ohler J.G., FAO and Intermediate Technology Publications, Ltd.
International Search Report and Written Opinion dated Jul. 9, 2008 (PCT/US2007/070212).
International Search Report and Written Opinion dated Sep. 22, 2008 (PCT/US2008/057223).

*Primary Examiner* — Michael G Hartley
*Assistant Examiner* — Nabila Ebrahim
(74) *Attorney, Agent, or Firm* — Fitch, Even, Tabin & Flannery, LLP

(57) ABSTRACT

Disclosed are animal litters, processes for preparing animal litters, and methods for removal of animal waste. The disclosed animal litters are made from ingredients including virgin germ and have a total fat content of about 0.5 to about 15 based on the weight of the litter. The litters are provided in the form of discrete plural particles which tend to agglomerate when wetted.

31 Claims, No Drawings

(56) References Cited

U.S. PATENT DOCUMENTS

| | | |
|---|---|---|
| 5,526,771 A | 6/1996 | Ito |
| 5,542,374 A | 8/1996 | Palmer, Jr. |
| 5,605,114 A | 2/1997 | Peltenburg et al. |
| 5,609,123 A | 3/1997 | Luke et al. |
| 5,662,067 A | 9/1997 | Stubbs et al. |
| 5,664,523 A | 9/1997 | Ochi et al. |
| 5,690,052 A | 11/1997 | Sladek |
| 5,740,761 A | 4/1998 | Lee et al. |
| 5,762,023 A | 6/1998 | Carter |
| 5,806,462 A | 9/1998 | Parr |
| 5,878,696 A | 3/1999 | Gerling et al. |
| 5,927,049 A | 7/1999 | Simard |
| 6,053,125 A | 4/2000 | Kory et al. |
| 6,098,569 A | 8/2000 | Kent et al. |
| 6,147,037 A * | 11/2000 | Gardlik et al. ............... 510/107 |
| 6,187,581 B1 | 2/2001 | Sicotte et al. |
| 6,216,634 B1 | 4/2001 | Kent et al. |
| 6,371,049 B1 | 4/2002 | Boden et al. |
| 6,405,677 B2 | 6/2002 | McPherson et al. |
| 6,622,658 B2 | 9/2003 | McPherson et al. |
| 6,803,033 B2 | 10/2004 | McGee et al. |
| 6,817,315 B1 | 11/2004 | Tsengas et al. |
| 6,868,802 B2 | 3/2005 | McPherson et al. |
| 7,637,229 B2 | 12/2009 | Hurwitz et al. |
| 7,753,002 B2 | 7/2010 | Wang et al. |
| 7,757,638 B2 | 7/2010 | Wang et al. |
| 7,793,616 B2 | 9/2010 | Ikegami |
| 2002/0028283 A1 | 3/2002 | Freeman |
| 2002/0134315 A1 | 9/2002 | Boden et al. |
| 2003/0113430 A1 | 6/2003 | Ethington, Jr. |
| 2003/0131799 A1 | 7/2003 | Wong et al. |
| 2003/0205204 A1 | 11/2003 | Wang et al. |
| 2004/0069237 A1 | 4/2004 | McPherson et al. |
| 2006/0201438 A1 | 9/2006 | Anttila et al. |
| 2007/0017453 A1 | 1/2007 | Fritter et al. |
| 2007/0172540 A1 * | 7/2007 | Neece et al. ............... 426/2 |
| 2007/0277739 A1 * | 12/2007 | Wang et al. ............... 119/161 |
| 2008/0223302 A1 | 9/2008 | Wang et al. |

* cited by examiner

ANIMAL LITTER, PROCESS FOR PREPARING ANIMAL LITTER, AND METHOD FOR REMOVAL OF ANIMAL WASTE

FIELD

The disclosure relates in some aspects to a grain-based animal litter, and more particularly relates to an animal litter comprising discrete plural particles which tend to agglomerate upon wetting. The disclosure further relates in other aspects to a process for preparing an animal litter, and to materials, products and processes.

BACKGROUND

Clumping animal litters are typically provided in the form of discrete plural particles. The particles tend to agglomerate into solid masses or clumps when wetted by a liquid, such as animal waste. The art has provided a number of clumping litters. One advantage of clumping litters is that the solid clumps formed upon wetting of the litter can be removed as discrete entities from the remaining litter and can be discarded by the animal owner, leaving behind a quantity of relatively uncontaminated litter. Animal owners, and in particular owners of animals such as house cats, often find the clumping property of such litters to be convenient for periodic cleaning of the animal litter box. Some known animal litters have good ammonia-masking properties. Because ammonia is a breakdown product of the urea found in animal urine, the ability of an animal litter to mask the odor of ammonia is a desired property.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Other litters are made from organic materials. For instance, numerous patents, e.g., U.S. Pat. Nos. 7,757,638; 7,753,002; 6,098,569; 6,216,634; 6,405,677; 6,622,658; and 6,868,802, describe making an animal litter with spent grain germ or spent oil seed meals, grain meal or ground corn.

One known litter product includes corn hominy feed and spent corn germ. Corn hominy feed is a by-product of the dry corn milling process, which produces as main products pearl hominy, hominy grits or table meal corn. Hominy feed is a mixture of corn bran, corn germ, and part of the starchy portion of either yellow or white corn kernels. Normally in a dry milling process, the germ is removed from the corn kernel in a "de-germinator," and then the corn bran and tip cap are removed. The endosperm is used to produce grits or corn flour. The process produces a number of mill streams (corn fractions) that differ in particle size, composition, and quality. The desired streams are collected and then the by-products and unwanted streams (sometimes called "fine through stock") are blended with the corn germ and corn bran to form hominy feed. Hominy feed generally contains nine percent protein (minimum), four percent fat (minimum), and six percent fiber (maximum). For example, a typical hominy feed includes 90 percent dry matter, 10.0 percent crude protein, 5 percent fat, 5.6 percent crude fiber, 49.5 percent neutral detergent fiber, 11.7 percent acid detergent fiber, 0.05 percent calcium, and 0.5 percent phosphorus. Corn germ contains about 20 to about 50 percent oil. Other components of corn germ include starch (about 8 percent by weight), protein (about 12 percent by weight), ash (about 2 percent by weight), moisture (about 8 percent by weight) and crude fiber (about 5 percent by weight). In commercial grain milling, grain germ often is extracted (e.g., by solvent or press extraction) to provide a rich source of grain oil, which results in "spent" germ.

Conventional litters often include added oils in an effort to improve agglomeration of the litter particles and to reduce dust during mixing, handling, packaging, and use of the product. For example, U.S. Pat. No. 5,152,250 to Loeb describes mixing granular litter with grain flour to cause agglomeration and mineral oil to cause the flour to adhere to the grains. U.S. Pat. No. 6,053,125 purports to describe oil-coating both heavy density particles and light density particles, such as with mineral oil added at 4 percent by weight of the total weight of the particles.

U.S. Pat. No. 5,230,305 states that the rate of sorption of urine by a natural animal litter is dependent upon the particular natural product and process used to prepare the litter. Thus, if a grain based material was used to prepare the litter, the litter would contain the oils naturally associated with the grain and these oils might decrease the rate of sorption of urine by the litter. In an effort to increase the rate of urine sorption, a wettability enhancing agent is added to the litter and the particle size distribution of the litter is adjusted. The wettability increasing agent could be any material that increases the rate of sorption of an aqueous liquid, such as urine, and may be a surface active agent sprayed onto the surface of the litter particles.

The invention seeks, in some embodiments, to provide an animal litter that differs from the heretofore described litters.

SUMMARY

An animal litter in the form of discrete plural particles is provided. The animal litter may be a clumping litter. The disclosure further includes methods for preparing an animal litter and methods for removing animal litter.

The animal litters provided herein are formulated from various naturally derived substrates, although it is contemplated that non-natural ingredients may also be included. By one approach, the litters are provided in the form of discrete plural compacted particles, such as pellets, which tend to agglomerate when wetted. It has been found that oil-containing germ and oil seeds that have not been defatted are particularly suitable for use in animal litter. Preferably, the particles are pellets prepared by pelletizing the various components of the animal litter in a pellet mill. In some embodiments, the particles are provided in the form of pellets that have been reduced in size, such as by crumbling the pellets.

In one embodiment, the litter includes a virgin grain germ, preferably virgin corn germ. The germ is included in an amount of about 0.5 to about 25 percent, in some embodiments about 21 to about 25 percent, and in other embodiments about 3 to about 8 percent, by weight of the litter. The germ may be included as part of a hominy feed mixture and/or as a separate ingredient. The litter further includes a second sorbent, which may be corn hominy feed, ground whole corn or de-hulled and de-germed corn, plant fiber, citrus residue (which may be a pulp or peel residue) and combinations thereof. The second sorbent preferably is a fibrous sorbent that is included in the litter in an amount effective to enhance agglomeration of the discrete plural particles of the litter. The first sorbent and other ingredients may be included in amounts to provide the litter with a total fat content of about 0.5 to about 15 percent, in some aspects with a total fat content of at least about 2 percent, in some aspects with a total fat content of about 11 to about 15 percent, in other aspects with a total fat content of about 3 to about 8 percent, and in some aspects with a fat content of about 4 to about 8 percent by weight of the litter.

Thus, in one embodiment, the litter may comprise:

virgin grain germ;

a discrete second sorbent selected from the group consisting of corn hominy feed, ground whole corn, de-hulled and de-germed corn, plant fiber, citrus residue, and mixtures thereof;

the litter having a fat content of about 0.5 to about 15 percent based on the total weight of the litter, and the animal litter being in the form of discrete plural compacted particles which tend to agglomerate when wetted.

By one approach, the litter is provided in the form of hominy feed with added virgin germ. In some embodiments, the hominy feed without germ is combined with virgin germ at a ratio to provide the desired amount of fat in the resulting hominy feed mixture. Additional germ may be added. The hominy feed mixture can be ground with a hammer mill or other suitable device to reduce the particle size of the mixture.

Generally, the method for preparing an animal litter includes compacting the ingredients that form the animal litter into discrete plural particles that tend to agglomerate when wetted. Preferably, the compacting is performed by pelletizing the ingredients in a pellet mill.

The methods for the removal of animal waste generally encompass providing a container that includes a litter as described herein, and removing animal waste after an animal has excreted waste into the litter, whereby liquid present in the waste causes agglomeration of at least some of the litter into at least one clump. In various embodiments, the litters described herein are useful in conjunction with removal of waste from cats, and also in conjunction with removal waste from other animals, such as other mammals (e.g., rodents) and birds.

Other features and embodiments are disclosed in the following description, examples, and appended claims.

DETAILED DESCRIPTION

The disclosure provides a clumping animal litter that agglomerates when wetted by a liquid, such as liquid animal excretions or liquid that is present in solid or semi-solid animal excretions. Generally, the litter provided herein includes virgin grain germ. The germ may be derived from any suitable grain. While grains such as wheat, corn, soy, *sorghum*, alfalfa, and barley are suitable for use in conjunction with the invention, the germ preferably is corn germ. Unspent or "virgin" grain germ is grain germ that has not been subjected to an oil extraction step, beyond any oil that may have incidentally been removed upon milling the grain. Virgin germ typically is obtained via wet or dry milling whole grain.

It was surprisingly found that oil-containing germ that has not been oil-extracted or pressed can be used to make an animal litter that has a higher total fat content than was previously thought to be able to absorb liquid animal waste. Advantageously, the litters provided herein in certain embodiments result in a small compact clump upon wetting with a liquid. The litters are functional without the need for a surfactant or other wettability increasing agent, although a wettability increasing agent can be included, if desired. It was found that the oil in the germ or oil seeds can act as a lubricant in the processes for making the animal litter, particularly for processes involving pelletizing or compacting feedstock ingredients together to make a low dust cat litter. The oil also can eliminate or reduce the need to add other lubricants during the manufacturing process.

Further, it was found that oil found naturally in the corn germ can be more stable in comparison to oil that is extracted and/or processed from germ and added to the litter. It is now believed that mechanical and heat processing steps can decrease the oxidative stability of oils and fats. For example, dry, intact corn kernels with high oil content in their germ have much longer storage life than processed food containing corn oil. Corn germ contains Vitamin E, which is an antioxidant effective for preventing oil/fat oxidation. When germ is coarsely ground to minimize processing of the germ, the oil-containing corn germ meal advantageously provides a more shelf-stable lubricant than processed oils and fats.

In one aspect, inclusive of oil-containing germ or seed meal instead of spent, defatted materials also eliminated the need to add oils or fats to animal litters to control dust and keep small, low density particles attached to larger or denser particles. The litters described herein made with virgin germ do not require other dust control agents, although dust control agents can be used, if desired.

It was also surprisingly found that using virgin germ instead of spent defatted materials in the litter is effective in suppressing odors of animal waste, particularly the ammonia odor from animal urine. Animal urines contain urea, which is hydrolyzed to ammonium carbonate by urease from bacteria in the environment. Ammonium carbonate is unstable and decomposes to ammonia, which provides the characteristic odor of urine. Advantageously, the oil or fat of the virgin germ in the litters provided herein can be hydrolyzed by ammonia through a reaction known as ammonolysis of esters, similar to saponification of esters with bases, to form glycerol and ammonium salt of fatty acids. This reaction advantageously can reduce or eliminate the ammonia odor.

In certain embodiments, the virgin grain germ is included in the animal litter in an amount of from about 0.5 percent to about 25 percent, in some aspects about 21 to about 25 percent, and in other embodiments about 3 to about 8 percent by weight of the litter. The germ may be present in an amount sufficient to impact a total fat content of about 0.5 to about 15 percent by weight of the litter, in some aspects a total fat content of at least about 2 percent, in some aspects a total fat content of about 11 to about 15 percent, in other aspects a total fat content of about 3 to about 8 percent, and in some aspects a fat content of about 4 to about 8 percent of the litter.

By one approach, the litter is provided in the form of hominy feed with added virgin germ. In one aspect, hominy feed without germ is combined with virgin germ at a ratio to provide the desired amount of fat in the resulting hominy feed mixture. The hominy feed mixture can be ground with a hammer mill or other suitable device to reduce the particle size of the mixture. In some embodiments, the ground hominy feed mixture can be combined with a further quantity of virgin germ and again ground with a hammer mill.

The litter can further include another sorbent such as ground whole corn, de-hulled or de-germed corn, plant fiber, citrus residue (which may be a pulp or peel residue), wood fiber and combinations thereof. This sorbent preferably is a fibrous material that is included in the litter in an amount effective to enhance agglomeration of the discrete plural particles of the litter. Generally, the second sorbent is included at about 5 to about 95 percent, in another aspect about 10 to about 40 percent, based on the weight of the animal litter.

The additional sorbent may comprise seed meal. If used, the seed meal may be used in any suitable amount, such as an amount of about 5 to about 95 percent, in another aspect of about 20 to about 60 percent, by total dry weight of the litter. Examples of such meals include linseed meal, soybean meal, sunflower meal, cotton seed meal, rapeseed meal, peanut meal, safflower seed meal, and combinations thereof. By "seed" is meant to include the part of a plant which is capable of forming a new plant upon germination, e.g., whole grains of wheat, including the fruit or fruit-like structure housing the seed, but excluding copra. In one aspect, the seed meal comprises seed that has not been treated by solvent extraction or expeller extraction. The seed is ground, by which is contemplated the reduction of the residue to smaller particles, preferably to a semi-course to fine powder. It is contemplated that some seeds will include a hull. Thus, the meal may comprise a dehulled meal or a meal that includes hulls.

The animal litter described herein can be provided in the form of discrete plural particles that are sufficiently cohesive for use as an animal litter. By "particles" is contemplated granules or pellets obtained by compaction. The compaction may be any process suitable for compressing the ingredients from which the litter is composed to an extent that the internal cohesion of the ingredients is increased. Generally, the mass of ingredients should become sufficiently internally cohesive for use as an animal litter. In some cases, a subsequent drying step may be necessary. The preferred method of compaction is by pelletizing the mixture of ingredients in a pellet mill, but other processes (such as extrusion) may be employed, if desired. The pellets formed in a pellet mill (or the extrudate formed upon extruding the litter mixture) can subjected to a process, such as crumbling, to reduce the size of the pellets (or extrudate).

The particles of litter should be sufficiently cohesive for use as an animal litter. In some embodiments, the particles can include a cohesiveness agent. The cohesiveness agent can be present in the animal litter in any suitable amount, which is preferably at least an amount effective to enhance the intra-particle cohesion of the animal litter particles. In one aspect, the cohesiveness agent is a polysaccharide. Any suitable polysaccharide can be used. For example, the cohesiveness agent can comprise materials such as maltodextrins, starches, fibers, flours, cellulosics, hemicellulosics (such as corn hull gum), xanthan gum, and the like. Preferably, the cohesiveness agent includes a starch, and most preferably, the cohesiveness agent includes a corn starch (e.g., an unmodified or non-gelatinized corn starch). In one aspect, when a starch is used in the animal litter, it is present in an amount of at least about 5 percent by weight of the animal litter (excluding starch that is present in any other ingredient), in another aspect, it is present in an amount of at least about 10 percent by weight of the animal litter.

The cohesiveness agent may further include a fibrous material. Fibers for use as a cohesiveness agent include soluble and insoluble fibers such as apple fiber, barley-bran flour, barley-flour, brewers spent grain, carrageenan gum, citrus fiber, citrus pulp sacs, cocoa, corn bran, corn fiber, dried cranberries, fig powder, guar gum, gum agar, gum Arabic, locust bean gum, oat bran, oat fiber, pea fiber, powdered cellulose, dried prunes, defatted rice bran, stabilized rice bran, rice fiber, sodium carboxymethylcellulose, soy fiber, sugar beat fiber, wheat bran, and defatted wheat germ. Other suitable fibers include, for example, cellulose, microcrystalline cellulose, resistant starch, chitin/chitosan, methylcellulose, hydroxypropyl methylcellulose, carboxymethylcellulose, pectin, alginate, karaya, tragacanth, gellan, arabinogalactan, inulin, konjac flour, psyllium seed husk, curdlan, and polydextrose. It is contemplated that some of these materials will function as sorbents in some embodiments of the invention. To the extent that a cohesiveness agent is indeed in the litter formation, the cohesiveness agent is an ingredient that is different from the "sorbent." In other words a litter that is said to include both a "sorbent" and a "cohesiveness agent" will have separate ingredients for the sorbent and the cohesiveness agent, even though the cohesiveness agent may have its own sorption properties.

The cohesiveness agent also can include a supplemental cohesiveness agent. The supplemental cohesiveness agent can be present in any amount sufficient to assist the cohesiveness agent in enhancing the cohesiveness of the animal litter particles. Suitable supplemental cohesiveness agents are described in, for example, U.S. Pat. No. 6,098,569. One preferred supplemental cohesiveness agent is sodium chloride.

Because the animal litter of the invention is made from biodegradable materials, the litter is subject to spoilage, such as by molding or bacterial action. To prevent or inhibit such spoilage, the litter can include a microbial inhibitor. A microbial inhibitor can be present in any amount effective to inhibit or prevent the spoilage of the animal litter.

In one embodiment, the spoilage inhibitor is a mold inhibitor. Any suitable mold inhibitor can be used and can include, for example, sodium chloride (which can also provide supplemental cohesive properties), propionic acid, propionate salts (e.g., sodium propionate, calcium propionate and the like), citric acid, citric acid salts (e.g., sodium citrate, calcium citrate, potassium citrate and the like), benzoate salts (e.g., sodium benzoate), parabens (e.g., methylparaben, ethylparaben, propylparaben and the like), sorbic acid, and sorbic acid salts (e.g., potassium sorbate and the like), lactic acid and lactic acid salts, acetic acid and acetic acid salts, alginic acid and alginic acid salts, and any combination thereof.

Preferably, the mold inhibitor includes citric acid, sodium chloride, potassium sorbate, or any combination thereof. More preferably, the mold inhibitor includes a combination of citric acid, sodium chloride and potassium sorbate or a combination of citric acid and sodium chloride. When citric acid is used, it is preferably present in an amount of about 0.5 percent to about 2 percent by weight of the animal litter. When sodium chloride is used, it is preferably present in the animal litter of the invention in an amount of about 0.5 percent to about 6.0 percent by weight of the animal litter (sodium chloride is believed to function as a supplemental cohesiveness agent when used in this amount). When potassium sorbate is used, it is preferably present in the animal litter of the invention in an amount of from about 0.1 percent to about 0.5 percent, more preferably from about 0.1 to about 0.2 percent, by weight of the animal litter. Other microbial inhibitors may be included if desired, and such ingredients can be present in any amount suitable for their intended purpose.

The litter may have any moisture content that permits use as an animal litter. When the litter is in the form of a clumpable product, the litter preferably has a moisture content sufficiently high to prevent the granules of animal litter from becoming friable and sufficiently low to allow additional moisture to be absorbed. Preferably, the moisture content is less than about 30 percent. More preferably, the moisture content ranges from about 5 percent to about 25 percent; even more preferably, the moisture content ranges from about 6 percent to about 20 percent; even more preferably, the moisture content ranges from about 8 percent to about 12 percent. It is contemplated that some of the moisture in the animal litter will be present originally in the first and/or second sorbent and/or cohesiveness agent.

The litter may further include a deodorizing agent, by which is contemplated a material whose functional purpose is to deodorize and/or to provide fragrance. Natural herbs and spices may be employed as deodorizing agents. When used, the deodorizing agent may be present in any suitable amount. In some embodiments, the deodorizing agent is present in an amount ranging from 0.1 percent to about 20.0 percent by weight. In some embodiments the deodorizing agent is present in an amount ranging from about 0.1 to about 5.0 percent by weight.

In one aspect, a scent is provided from a natural source, such as but not limited to alfalfa, almond, amber, angelica root, anise, apple, apricot, banana, basil, bay, bay laurel, benzoin, bergamot, bitter orange, black pepper, bois de rose (rosewood), cajeput, cardamom, carrot seed, cedarwood, cedarwood atlas, cinnamon, citronella, citrus, clary sage, clove, cocoa, coconut, coffee, coriander, cranberry, cypress, elemi, eucalyptus globulous, eucalyptus, fennel, frankincense, galbanum, geranium, German chamomile, ginger, grapefruit, helichrysum, hyssop, jasmine, juniper berry, lavender, lemon, lemongrass, lily, linden blossom, mango, marjoram, melissa, mint, myrrh, myrtle, neroli, niaouli, nutmeg, orange, oregano, palm, parsley, patchouli, peach, peppermint, petitgrain, pine, pineapple, raspberry, Roman chamomile, rose, rosemary, sandalwood, spearmint, spruce, strawberry, tea, thyme, vanilla, vetiver, violet, yarrow, ylang ylang, and the like. Plant parts that do not provide a scent or have very low scent but that are visually appealing can also be used. The plant parts can be subjected to a process to reduce the size of the parts to a size suitable for addition to an animal litter.

Essential oils or other plant extracts can be used in the litters described herein. Extracts can be physically obtained, such as by pressing or squeezing, or by using solvent, such as oil, organic solvent, or water, to process plant parts. For example, orange oil can be obtained from orange peels, and rose oil can be extracted from rose petals using vegetable or mineral oil. Commercially-available essential oils can also be used, if desired. By one approach, one or more plant extracts or essential oils can be blended to provide a desired scent. For example, a blend of plant extracts can be provided to give a rose, "earthy," "spring," "fresh," "ocean," or other desired scent as can be readily formulated by a skilled person in the art.

In one aspect, the deodorizing agent may include natural or synthetic fragrances. Suitable fragrances include, for example, Modern Lavender, Lavender Fields, Natural Fresh Clean, Baby Fresh Natural, Natural Amber Balsam, Natural Sweet Amber, Natural Fresh Citrus, Natural Fresh Air, and Rose from Fragrance West, Van Nuys, Calif., Baby Fresh, Lilac, Violet, Rose, Jasmine, and Lavender from Bell Flavors & Fragrances, Inc., Northbrook, Ill., Natural Lavender, Rose Geranium, Natural Rosemary Mint, Baby Powder, and Fresh Blossoms Natural from Flavor and Fragrance Specialties, Mahwah, N.J., and Lavender, Jasmine, Amber, and Fresh Wave from Alpha Aromatics, Fox Chapel, Pa.

In some embodiments, the litters provided herein include colorful plant parts, such as flowers, flower buds, petals, or the like, to provide visually appealing colored particles to the litter. In one aspect, the colorful plants parts also provide a natural scent to the litter. In another aspect, the colorful plant parts are provided in combination with a natural based fragrance, such as with a scented oil. For example, brightly colored particles made from dried flowers and petals are often weak in scent and the fragrance of the particles can be enhanced by inclusion of a natural or synthetic fragrance.

The litter may include a blend of essential oil formulated to have lavender scent. For example, "Natural Lavender fragrance" Item #114B13 or 112E13 made by Flavor and Fragrance Specialties, Mahwah, N.J., can be sprayed onto the animal litter at the ratio of 1.6 to 3.5 lbs per ton to provide the litter with a lavender scent.

By another approach, a blend of essential oil formulated to fresh blossom scent, like the "Fresh Blossoms Natural" fragrance" Item #112B17 made by Flavor and Fragrance Specialties, Mahwah, N.J., can be sprayed onto the animal litter at the ratio of 1.6 to 3.5 lbs per ton to provide the litter with a fresh flower blossom scent.

The litter may include dried lavender flowers and flower buds can be added to the lavender or fresh blossom scented litter at a ratio of 1 to 6.3 lbs per ton of litter. The dried lavender flowers and buds provide a pleasant and sweet scent to the litter while also providing bright colored particles which are appealing to consumers. The flowers provide the impression of a natural fresh scent even though the scent is provided primarily from the essential oil.

In another aspect, dried global amaranth flowers and flower petals can be added to the lavender or fresh blossom scented litter.

By another approach, no scented oils are added to the litters. Instead, dried global amaranth flowers and flower petals are added at a ratio of about 0.88 pounds per ton of litter and lavender flowers and buds are added at a ratio of about 6.3 pounds per ton of litter. The global amaranth flowers and petals have significantly brighter color than the lavender flowers and provide brightly colored particles that are appealing to consumers but are weak in scent. The dried lavender flowers and buds provide an appealing visual appearance and a pleasant and sweet scent to the litter. The colorful amaranth flowers and scent from the lavender flowers provide consumers with the impression of a natural, fresh scent.

In yet another aspect, dried "forget-me-not" flowers, rose petals, purple clover flowers, global amaranth flowers and flower petals, cornflower, cowslip, St. John's wort flowers, yarrow flowers, or field poppy flowers, are added to the litter at a ratio of about 0.88 pounds to 2 pounds per ton of litter. The dried flowers and petals provide brightly colored particles that are appealing to consumers.

By one approach, the scent of the litter can be changed seasonally. For example, the litter can be scented to reflect each of the four seasons of the year. For example, a coffee scent can be prepared from spent coffee grounds. A vanilla scent can be provided from vanilla extract. A coconut scent can be provided from coconut copra pellets. A strawberry or apple scent can be provided by addition of apple or strawberry by-products.

In some cases, the animal litter including plant parts and/or fragrance is packaged under conditions effective to lengthen the shelf life of the scented product. In one aspect, the scented litters can be packaged in a plastic bag with oxygen barrier properties, such as, for example, a laminated polyethylene and polyester or nylon plastic package. In another aspect, the packaging is purged with nitrogen gas to reduce the oxygen level inside the package to less than 10 percent v/v, preferably less than 2 percent v/v. The lower oxygen content would reduce the oxidization of components of the natural fragrance, which was believed to reduce the shelf life of the natural fragrance. Under these conditions, the shelf life of the scented litter is at least about 20 weeks.

Because the animal litters described herein are to be used to absorb animal waste, the litter should have a sorption capacity sufficient to allow the animal litter to so function. The sorption capacity of the preferred litters of the invention typically is at least about 0.4 ml water per gram of litter, and more typically ranges from about 0.04 to about 2.4 ml/g; more typically, the sorption capacity is from about 0.8 to about 1.4 ml/g. The sorption capacity is determined per gram of animal litter, and is based on the sorption of deionized water, as described in more detail in U.S. Pat. No. 6,098,569. Preferred sorption capacity ranges are believed to approximate that of animal urine.

Other properties may be desired of an animal litter. For example, to minimize inconvenience and mess associated with packaging, transporting, and using the litter, the litter preferably generates a minimal amount of dust. The preferred litters of the present invention do not generate substantial dust. Another preferred property is clumping efficiency. Clumping efficiency is the amount of litter required to form a clump with a given volume of liquid, with lower amounts of required litter corresponding to higher clumping efficiencies.

Other desired properties include biodegradability and tendency to remain clumped. Biodegradability is particularly desired when the animal owner wishes to dispose of clumps of litter by flushing them into the toilet. The litter of the invention is believed to be at least as biodegradable as hull-based materials, and thus the litter of the invention may be disposed of by flushing, even into a septic system. Tendency to remain clumped refers to the stability of the clump of clumped cat litter. A clumping litter should remain clumped for at least 48 hours after the clump has formed. The litters of the invention have an excellent tendency to remain clumped.

The disclosure is also directed towards a process for preparing an animal litter. By one approach, the process comprises compacting ingredients forming the animal litter into discrete plural particles of a size suitable for use as a litter. In some embodiments, the particle size is accomplished by reducing a larger mass to the desired size. Preferably, the process includes a step of compacting or compressing the particles of animal litter into granules or pellets, which most preferably is accomplished in a pelletizing operation. The stabilizer or mold inhibitor, cohesiveness agent, and/or lubricant, when used, can be added at any suitable stage, and preferably are mixed with the other components of the litter in the desired proportions prior to pelletizing.

When a pellet mill is employed to prepare the compacted particles, the moisture content in the pellet mill feed preferably is in the ranges described herein with respect to the moisture content in the finished product, and preferably is about 10 to about 14%. Optionally, moisture can be added to the feedstock in the form of liquid water to bring the feedstock to the desired moisture content. The temperature in the pellet mill preferably is brought to about 70 to about 90° C., e.g., about 82° C., using steam. The pellet mill may be operated under any conditions that impart sufficient work to the feedstock to provide pellets. It is believed that the particle size of the starting materials, the temperature within the pellet mill, and other variables can affect the properties of the final product. The pellet mill can be operated with a suitable die (e.g., a $3/32$ in.×$5/8$ in. die) at a pressure and temperature effective to provide pellets. The pellets preferably are then crumbled in a pellet mill crumbler to provide discrete plural particles having a particle size capable of passing through an 8 mesh screen but being retained on a 20 mesh screen. As described herein, lubrication is preferably provided by adding a virgin germ. In other embodiments, lubrication may be provided by adding another lubricant, such as a vegetable oil.

Also contemplated in some embodiments is a method for removal of animal waste. Generally, an animal is allowed to extricate waste into a container and a clump of litter is removed. After soiled litter has dropped to the bottom of the litter box, some or all of the soiled litter may be removed from the box, for instance, by separating the soiled litter from remaining unsoiled litter and disposing of the soiled litter. Alternatively, the soiled litter may be removed without separating it from any unsoiled litter in the box, by disposing of all or substantially all of the litter in the box. In either case, animal waste will be thereby removed. Optionally, the supply of litter may be replenished with fresh litter. If the litter is not used in a container (for instance, the litter is spread onto a field), the soiled litter may be removed from the area in which the litter originally was applied The following examples demonstrate various embodiments of the invention but should not be construed as limiting the scope of the invention.

EXAMPLES

In these Examples, DCM-121 is a commercial product (Bunge North America, St. Louis, Mo.) composed of a blend of corn hominy feed from a corn dry milling process and corn virgin germ from a dry milling process. DCM-121 is prepared by blending and grinding virgin germ and hominy with a hammer mill or other milling equipment to yield a mixture having a predetermined fat content. The amount of virgin germs is increased or decreased depending on the desired level of fat in the DCM-121 product with a larger proportion of virgin germs being included in order to increase the fat content.

Example 1

This example demonstrates the production of an exemplary litter. DCM-121 with 12% fat was mixed with additional corn virgin germs and other ingredients to make a cat litter according to the recipe of Table 1 below.

TABLE 1

| INGREDIENTS | % WEIGHT OF FORMULA |
| --- | --- |
| Ground Citrus Peel Pellets (SPN) | 23.00% |
| Cornstarch | 12.00% |
| Ground corn ($3/16$") | 31.85% |
| Ground "virgin" germ | 1.25% |
| DCM-121 (12% fat) | 28.75% |
| Citric acid | 1.00% |
| Salt | 2.00% |
| Potassium sorbate | 0.15% |

Example 2

This example demonstrates the production of another exemplary litter. DCM-121 with 12% fat was mixed with additional corn virgin germs and other ingredients to make a cat litter according to the formula of Table 2.

TABLE 2

| INGREDIENTS | % WEIGHT OF FORMULA |
| --- | --- |
| Ground whole corn ($3/16$" screen) | 41.90% |
| Ground "virgin" germ | 1.25% |
| DCM-121 (12% fat) | 23.75% |
| Fine-ground corn bran | 15% |
| Corn starch | 10% |
| Citric acid | 1.00% |
| Salt | 2% |
| Potassium sorbate | 0.10% |

Example 3

This example demonstrates the production of an exemplary litter having a total fat content of about 3 to about 4%. DCM-121 with 12% fat was mixed with additional ingredients to make a cat litter according to the formula of Table 3.

TABLE 3

| INGREDIENTS | % WEIGHT OF FORMULA |
| --- | --- |
| Ground citrus orange peel/pulp pellets (1/16" screen) | 20.0% |
| Corn starch | 15.0% |
| Ground corn (3/16" screen) | 46.9% |
| DCM-121 (12% fat) | 15.00% |
| Citric acid | 1.0% |
| Salt | 2.0% |
| Potassium sorbate | 0.10% |

Example 4

A portion of DCM-121 with 3% fat was mixed with corn virgin germs at a ratio of 85:15 and then ground with a hammer mill to form a DCM-121/germ mixture. The DCM-121/germ mixture was then mixed with the remaining DCM-121 and other ingredients to make a cat litter according to the formula of Table 4.

TABLE 4

| INGREDIENTS | % WEIGHT OF FORMULA |
| --- | --- |
| Ground whole corn (3/16" screen) | 43.90% |
| DCM-121 (3% fat) | 23.8% |
| Corn virgin germ | 4.2% |
| Fine-ground corn bran | 15% |
| Starch (B200) | 10% |
| Citric acid | 1.00% |
| Salt | 2% |
| Potassium sorbate | 0.10% |

Example 5

A portion of DCM-121 with 3% fat was mixed with corn virgin germs at a ratio of 85:15 and then ground with a hammer mill to form a DCM-121/germ mixture. The DCM-121/germ mixture was then blended with the remaining DCM-121 and other ingredients to make a cat litter according to the formula of Table 5.

TABLE 5

| INGREDIENTS | % WEIGHT OF FORMULA |
| --- | --- |
| Ground citrus orange peel/pulp pellets (1/16" screen) | 20.0% |
| Starch | 15.0% |
| Ground corn (3/16" screen) | 41.9% |
| DCM-121 (3% fat) | 17% |
| Corn virgin germ | 3.00% |
| Citric acid | 1.0% |
| Salt | 2.0% |
| Potassium sorbate | 0.10% |

Example 6

A portion of DCM-121 with 5% fat was mixed with additional corn virgin germs at a 75:25 ratio and ground with a hammer mill to form a DCM-121/germ mixture. Then the DCM-121/germ mixture was mixed with the remaining DCM-121 and other ingredients to make a cat litter according to the formula of Table 6.

TABLE 6

| INGREDIENTS | % WEIGHT OF FORMULA |
| --- | --- |
| Ground citrus peel pellets | 23.00% |
| Corn starch | 12.00% |
| Ground corn (3/16") | 31.85% |
| Corn virgin germ | 1.25% |
| DCM-121 (5% fat) | 28.75% |
| Citric acid | 1.00% |
| Salt | 2.00% |
| Potassium sorbate | 0.15% |

Example 7

A portion of DCM-121 with 5% fat was mixed with additional corn virgin germs at a 75:25 ratio and ground with a hammer mill to form a DCM-121/germ mixture. Then the DCM-121/germ mixture was mixed with the remaining DCM-121 and other ingredients to make a cat litter according to the formula of Table 7.

TABLE 7

| INGREDIENTS | % WEIGHT OF FORMULA |
| --- | --- |
| Ground whole corn (3/16" screen) | 41.90% |
| Corn virgin germ | 3.00% |
| DCM-121 (5% fat) | 27% |
| Fine-ground corn bran | 15% |
| Corn starch | 10% |
| Citric acid | 1.00% |
| Salt | 2% |
| Potassium sorbate | 0.10% |

Example 8

A portion of DCM-121 with 5% fat was mixed with additional corn virgin germs at a 75:25 ratio and ground with a hammer mill to form a DCM-121/germ mixture. Then the DCM-121/germ mixture was mixed with the remaining DCM-121 and other ingredients to make a cat litter according to the formula of Table 8.

TABLE 8

| INGREDIENTS | % WEIGHT OF FORMULA |
| --- | --- |
| Ground citrus orange peel/pulp pellets (1/16" screen) | 20.0% |
| Corn starch | 15.0% |
| Ground corn (3/16" screen) | 46.9% |
| Corn virgin germ | 3.75% |
| DCM-121 (5% fat) | 11.25% |
| Citric acid | 1.0% |
| Salt | 2.0% |
| Potassium sorbate | 0.10% |

Example 9

A portion of DCM-121 with 12% fat was mixed with additional corn virgin germ at a 75:25 ratio and ground with a hammer mill to form a DCM-121/germ mixture. Then the DCM-121/germ mixture was mixed with the remaining DCM-121 and other ingredients to make a cat litter according to the formula of Table 9.

TABLE 9

| INGREDIENTS | % WEIGHT OF FORMULA |
|---|---|
| Ground whole corn (3/16" screen) | 44.11% |
| Corn virgin germ | 1.30% |
| DCM-121 (12% fat) | 20.23% |
| Fine-ground corn bran | 15.79% |
| Corn starch | 5.26% |
| Citric acid | 1.05% |
| Salt | 2.11% |
| Potassium sorbate | 0.11% |

Example 10

A portion of DCM-121 with 12% fat was mixed with additional corn virgin germ at a 75:25 ratio and ground with a hammer mill to form a DCM-121/germ mixture. Then the DCM-121/germ mixture was mixed with the remaining DCM-121 and other ingredients to make a cat litter according to the formula of Table 10.

TABLE 10

| INGREDIENTS | % WEIGHT OF FORMULA |
|---|---|
| Ground citrus peel pellets (SPN) | 23.00% |
| Corn starch | 12.00% |
| Ground corn (3/16") | 31.85% |
| Corn virgin germ | 1.25% |
| DCM-121 (12% fat) | 28.75% |
| Citric acid | 1.00% |
| Salt | 2.00% |
| Potassium sorbate | 0.15% |

Example 11

A portion of DCM-121 with 3% fat is mixed with additional corn virgin germ at a 75:25 ratio and ground with a hammer mill to provide a DCM-121/germ mixture. The DCM-121/germ mixture is mixed with the remaining DCM-121 and other ingredients to make a cat litter according to the formula of Table 11. The litter is prepared by extruding through a 5/32×2VR+NVR (variable relief–non-variable relief) die.

TABLE 11

| INGREDIENTS | % WEIGHT OF FORMULA |
|---|---|
| DCM-121 (3% fat) | 89% |
| Salt | 2% |
| Ground full fat corn germ (%) | 9% |

Example 12

DCM-121 with 3% fat is mixed with additional ingredients to make a cat litter according to the formula of Table 12.

TABLE 12

| INGREDIENTS | % WEIGHT OF FORMULA |
|---|---|
| DCM-121 (3% fat) | 87 |
| Salt | 2 |
| Myvaplex surfactant | 2 |
| Corn starch | 8 |
| Corn oil | 1 |

Example 13

A portion of DCM-121 with 3% fat is mixed with additional corn virgin germ at a 75:25 ratio and ground with a hammer mill to provide a DCM-121/germ mixture. The DCM-121/germ mixture is mixed with the remaining DCM-121 and other ingredients to make a cat litter according to the formula of Table 13.

TABLE 13

| INGREDIENTS | % WEIGHT OF FORMULA |
|---|---|
| DCM-121 (3% fat) | 86% |
| Ground full fat corn germ | 5% |
| Salt | 2% |
| Corn starch | 5% |
| Myvaplex surfactant | 1% |
| Citric acid | 1% |

Example 14

A portion of DCM-121 with 3% fat is mixed with additional corn virgin germ at a 75:25 ratio and ground with a hammer mill to provide a DCM-121/germ mixture. The DCM-121/germ mixture is mixed with the remaining DCM-121 and other ingredients to make a cat litter according to the formula of Table 14.

TABLE 14

| INGREDIENTS | % WEIGHT OF FORMULA |
|---|---|
| DCM-121 (3% fat) | 82.5% |
| Ground full fat corn germ | 9% |
| Salt | 2% |
| Corn starch | 5% |
| Citric acid | 1.5% |

Example 15

A portion of DCM-121 with 3% fat is mixed with additional corn virgin germ at a 75:25 ratio and ground with a hammer mill to provide a DCM-121/germ mixture. The DCM-121/germ mixture is mixed with the remaining DCM-121 and other ingredients to make a cat litter according to the formula of Table 15.

TABLE 15

| INGREDIENTS | % WEIGHT OF FORMULA |
|---|---|
| DCM-121 (3% fat) | 66.5% |
| Ground full fat corn germ | 5% |
| Salt | 2% |
| Fine-ground corn bran | 15% |
| Corn starch | 10% |
| Citric acid | 1.5% |

Example 16

DCM-121 with 3% fat is mixed with additional ingredients to make a cat litter according to the formula of Table 16.

TABLE 16

| INGREDIENTS | % WEIGHT OF FORMULA |
| --- | --- |
| DCM-121 (3% fat) | 62.5% |
| Ground citrus peel pellets (1/16" screen) | 20% |
| Salt | 2% |
| Corn starch | 14% |
| Citric acid | 1.5% |

Example 17

DCM-121 with 3 percent fat is mixed with additional ingredients to make a cat litter according to the formula of Table 17.

TABLE 17

| INGREDIENTS | % WEIGHT OF FORMULA |
| --- | --- |
| DCM-121 (3% fat) | 66.4% |
| Ground citrus peel pellets (1/16" screen) | 20% |
| Salt | 2% |
| Corn starch | 10% |
| Citric acid | 1.5% |
| Potassium sorbate | 0.1% |

Example 18

A portion of DCM-121 with 3% fat is mixed with additional corn virgin germ at a 75:25 ratio and ground with a hammer mill to provide a DCM-121/germ mixture. The DCM-121/germ mixture is mixed with the remaining DCM-121 and other ingredients to make a cat litter according to the formula of Table 18.

TABLE 18

| INGREDIENTS | % WEIGHT OF FORMULA |
| --- | --- |
| Ground citrus orange peel/pulp pellets (1/16" screen) | 20 |
| Ground corn cobs (through 1/16" screen) | 20 |
| DCM-121 (3% fat) | 53.10 |
| Ground full fat corn germ | 3.75 |
| Citric acid | 1 |
| Salt | 2 |
| Potassium sorbate | 0.15 |

Example 19

DCM-121 with 3% fat is mixed with additional ingredients to make a cat litter according to the formula of Table 19.

TABLE 19

| INGREDIENTS | % WEIGHT OF FORMULA |
| --- | --- |
| DCM-121 (3% fat) | 71.85% |
| Ground citrus peel pellets (1/16" screen) | 25% |
| Salt | 2% |
| Citric acid | 1.0% |
| Potassium sorbate | 0.15% |

Example 20

A portion of DCM-121 with 3% fat is mixed with additional corn virgin germ at a 75:25 ratio and ground with a hammer mill to provide a DCM-121/germ mixture. The DCM-121/germ mixture is mixed with the remaining DCM-121 and other ingredients to make a cat litter according to the formula of Table 20.

TABLE 20

| INGREDIENTS | % WEIGHT OF FORMULA |
| --- | --- |
| Ground corn cobs (through 1/16" screen) | 25 |
| DCM-121 (3% fat) | 56.10 |
| Ground full fat corn germ | 3.75 |
| Corn Starch | 12% |
| Citric acid | 1 |
| Salt | 2 |
| Potassium sorbate | 0.15 |

Example 21

DCM-121 with 3% fat is mixed with additional ingredients to make a cat litter according to the formula of Table 21.

TABLE 21

| INGREDIENTS | % WEIGHT OF FORMULA |
| --- | --- |
| DCM-121 (3% fat) | 59.9% |
| Wheat middlings | 37% |
| Salt | 2% |
| Citric Acid | 1% |
| Potassium sorbate | 0.1% |

Example 22

Six corn meal products obtained commercially from a corn dry-miller were evaluated for particle size. The test was conducted by stacking mesh screens with decreasing pore size, i.e., 20-mesh screen atop a 25-mesh screen atop a 30-mesh screen, and so forth. Ground corn meal was then poured on the top screen of the screen stack. The screens with the corn meal were put on a shaker machine, such as a RO-TAP®, Sieve Shaker from W.S. Tyler Industrial Group (Mentor, Ohio) to shake for 10 to 15 minutes. The screens were then removed from the screen stack so that the amount of particles remaining above each screen could be measured. The values given below are expressed as the weight percent of ground corn meal (versus total beginning weight) that remained on each screen after the screen was removed from the screen stack. The results are presented below in Table 22.

TABLE 22

Ground corn meal particle size distribution

| Ground Corn Meal | % Above the Screen Size in Mesh | | | | | | | | | |
|---|---|---|---|---|---|---|---|---|---|---|
| | 20 (850 μm opening) | 25 (710 μm opening) | 30 (600 μm opening) | 40 (425 μm opening) | 50 (300 μm opening) | 60 (250 μm opening) | 80 (180 μm opening) | 100 (150 μm opening) | 200 (75 μm opening) | −200 (<75 μm opening) |
| Coarse ground sample 254 | 0.5 | | 14.5 | 40 | 25 | 20 | | | | |
| Coarse ground sample 255 | | | 35 | 50 | | 13.5 | 1.5 | | | |
| Coarse ground sample 350 | | | 3 | 85 | | 10 | 2 | | | |
| Coarse ground sample 401 | | | 0 | 0.3 | | | 92 | 7.7 | | |
| Finer ground sample 600 | | | 0.1 | 0.2 | | 2.7 | | 22 | 40 | 35 |
| Finer ground sample 610 | | | 0 | 0.1 | | 2.4 | | 30 | 35 | 32.5 |

The particles of the coarsely ground corn meal samples 254, 255, and 350 stayed above the 80 mesh or preceding screens having larger openings. All but a small percentage of particles of the coarsely ground corn meal samples 401 in Table 22 stayed above the 80 mesh screen or preceding screen with larger openings. A majority of the particles of the finely ground corn meals (samples 600 and 610) were small enough to pass through the 80 mesh screen.

By grinding the corn meal to a finer particle size, the total number of particles and surface area of the particles in a given amount of corn is increased. The increased total surface area of the particles is positively correlated to liquid absorption.

The ground corn meals are used to make a cat litter according to formulations 1 to 6 of Table 23. The ground corn meals are mixed with 1 to 8 percent additional ingredients, including salt, citric acid, and potassium sorbate, then compacted or pelletized using a pellet mill. The pellets are crumbled to form discrete plural particles having a primary particle size sufficient to pass through an 8-mesh screen and to be retained on a 20-mesh screen and then used as a cat litter.

Surprisingly, it was found that smaller particle sizes of the ground corn meal contributed to improved clumping of the litter. By grinding the corn meal fine enough to have at least 80 percent of particles smaller than an 80 mesh screen opening, e.g., "finer ground corn meal 600" and "finer ground corn meal 610," a better clumping litter could be made. At the same time, if the corn meal was coarsely ground, e.g., coarse ground corn meals 254, 255, 350, 401 in Table 22, the cat litters produced (#1, #2, #3, and #4) were relatively poor in clumping. It is believed that this may be due to the smaller surface area of the particles of the ground corn, whereby the litter does not response quickly enough to absorb urine or liquid, resulting in the liquid running down through 2" to 3" thick of the litter in the litter box.

TABLE 23

Formula and performance of litters made from ground corn meals

| Ingredient | Formula (Percentage based on total weight (as-is)) | | | | | |
|---|---|---|---|---|---|---|
| | #1 | #2 | #3 | #4 | #5 | #6 |
| Coarse ground corn meal 254 | 96.5 | | | | | |
| Coarse ground corn meal 255 | | 96.5 | | | | |
| Coarse ground corn meal 350 | | | 96.5 | | | |
| Coarse ground corn meal 401 | | | | 96.5 | | |
| Finer ground corn meal 600 | | | | | 96.5 | |
| Finer ground corn meal 610 | | | | | | 96.5 |
| Citric acid | 1.5 | 1.5 | 1.5 | 1.5 | 1.5 | 1.5 |
| Salt | 2 | 2 | 2 | 2 | 2 | 2 |
| Potassium sorbate | 0.1 | 0.1 | 0.1 | 0.1 | 0.1 | 0.1 |
| Test | | | | | | |
| 5-min. Clump Weight (g) | Poor clumping, run through, | Poor clumping, run through, | Poor clumping, run through, | Poor clumping, run through, | 56.6 gram | 61.8 grams |
| Ammonia-masking | Poor | Poor | Poor | Poor | OK | OK |

Note:
3/32" × 5/8" Die.

Example 23

An animal litter according to Example 1 is placed into a cat box. After a cat has excreted urine into the cat box, the litter forms a clump, and the clump is removed.

It is thus seen that excellent animal litters may be formed in connection with the teachings herein.

The references cited herein are incorporated by reference in their entireties. Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. An animal litter comprising:
   a plurality of discrete plural particles which tend to agglomerate when wetted, each of the discrete plural particles comprising a first sorbent and a discrete second sorbent,
   the first sorbent comprising a blend of about 21 to about 25 percent virgin grain germ,
   the discrete second sorbent comprising hominy feed in an amount of at least about 5 percent,
   the virgin grain germ and hominy feed being provided in an amount effective to provide the litter with a fat content of about 11 to about 15 percent based on the total weight of the litter.

2. The animal litter according to claim 1, said discrete second sorbent further comprising a citrus peel residue.

3. The animal litter according to claim 1, said discrete second sorbent further comprising a citrus pellet residue.

4. The animal litter according to claim 2, said citrus peel residue comprising a pectin peel residue.

5. The animal litter according to claim 1, the discrete second sorbent further comprising a plant fiber.

6. The animal litter according to claim 5, wherein the plant fiber comprises a fiber selected from the group consisting of oat fiber, rice bran fiber, barley fiber, cellulose fiber, wheat fiber, corn fiber, and combinations thereof.

7. The animal litter according to claim 5, wherein the plant fiber comprises a corn bran fiber.

8. The animal litter according to claim 5, wherein the discrete second sorbent is included in an amount of about 5 to about 95 percent based on the weight of the litter.

9. The animal litter according to claim 5, further comprising at least about 5 percent cohesiveness agent.

10. The animal litter according to claim 1, further comprising about 0.1 to about 20 percent deodorizing agent, the deodorizing agent comprising at least one of the group consisting of flowers, flower buds, petals, essential oil, plant extract, natural fragrance, synthetic fragrance, and combinations thereof.

11. The animal litter according to claim 1, further comprising about 0.1 to about 20 percent deodorizing agent, the deodorizing agent comprising essential oil and plant parts.

12. The animal litter according to claim 11, wherein the plant parts include at least one of the group consisting of flowers, flower buds, petals, and combinations thereof.

13. An animal litter comprising:
    a plurality of discrete plural particles which tend to agglomerate when wetted, each of the discrete plural particles comprising a first sorbent, a discrete second sorbent and a cohesiveness agent,
    said first sorbent comprising about 21 to about 25 percent virgin grain germ,
    the discrete second sorbent comprising about 5 to about 95 percent hominy feed,
    said cohesiveness agent comprising a starch,
    the cohesiveness agent being present in said litter in an amount effective to enhance the intraparticle cohesion of said particles,
    the virgin grain germ and hominy feed being provided in an amount effective to provide the litter with a fat content of about 0.5 to about 15 percent based on the total weight of the litter.

14. The animal litter according to claim 13, the discrete second sorbent further comprising at least one of the group consisting of ground whole corn, de-hulled and de-germed corn, plant fiber, and citrus residue.

15. The animal litter according to claim 14, the discrete second sorbent comprising a citrus peel residue.

16. The animal litter according to claim 14, the citrus peel residue comprising a citrus pellet residue.

17. The animal litter according to claim 14, the citrus peel residue comprising a pectin peel residue.

18. The animal litter according to claim 14, the discrete second sorbent comprising ground whole corn.

19. The animal litter according to claim 14, the plant fiber selected from the group consisting of corn bran fiber, oat fiber, rice bran fiber, barley fiber, cellulose fiber, wheat fiber, and combinations thereof.

20. The animal litter according to claim 13, wherein the starch comprises a corn starch.

21. The animal litter according to claim 13, further comprising about 0.1 to about 20 percent deodorizing agent, the deodorizing agent comprising at least one of the group consisting of flowers, flower buds, petals, essential oil, plant extract, natural fragrance, synthetic fragrance, and combinations thereof.

22. The animal litter according to claim 13, further comprising about 0.1 to about 20 percent deodorizing agent, the deodorizing agent comprising essential oil and plant parts.

23. The animal litter according to claim 22, wherein the plant parts include at least one of the group consisting of flowers, flower buds, petals, and combinations thereof.

24. A process for preparing an animal litter, the method comprising:
preparing a blend of about 5 to about 95 percent hominy feed and about 21 to about 25 percent virgin grain germ;
combining said blend with a discrete second sorbent selected from the group consisting of ground whole corn, de-hulled and de-germed corn, plant fiber, citrus residue, and mixtures thereof to provide a litter mixture; and
compacting the litter mixture into discrete plural compacted particles which tend to agglomerate when wetted, each of the discrete plural compacted particles comprising the hominy feed and the virgin grain germ,
the litter having a fat content of about 0.5 to about 15 percent based on the total weight of the litter.

25. The process according to claim 24, the discrete second sorbent comprising a citrus peel residue.

26. The process according to claim 24, the discrete second sorbent comprising a citrus pellet residue.

27. The process according to claim 24, the discrete second sorbent comprising a plant fiber.

28. The process according to claim 27, wherein the plant fiber comprises a fiber selected from the group consisting of oat fiber, rice bran fiber, barley fiber, cellulose fiber, wheat fiber, corn fiber, and combinations thereof.

29. The process according to claim 24, further comprising adding about 0.1 to about 20 percent deodorizing agent, the deodorizing agent comprising at least one of the group consisting of flowers, flower buds, petals, essential oil, plant extract, natural fragrance, synthetic fragrance, and combinations thereof.

30. The process according to claim 24, further comprising adding about 0.1 to about 20 percent deodorizing agent, the deodorizing agent comprising essential oil and plant parts.

31. The process according to claim 30, wherein the plant parts include at least one of the group consisting of flowers, flower buds, petals, and combinations thereof.

* * * * *